US012653085B2

(12) United States Patent     (10) Patent No.:   US 12,653,085 B2

Barry et al.     (45) Date of Patent:    Jun. 16, 2026

(54) APPARATUS, SYSTEMS AND METHODS FOR STEERABLE TOOLBARS

(71) Applicant: Ag Leader Technology, Ames, IA (US)

(72) Inventors: Alan F. Barry, Nevada, IA (US);
Loren Leusink, Ames, IA (US); Jacob Christensen, Ames, IA (US); Kurt Townsend, Ames, IA (US)

(73) Assignee: Ag Leader Technology, Ames, IA (US)

( * ) Notice: Subject to any disclaimer, the term of this patent is extended or adjusted under 35 U.S.C. 154(b) by 195 days.

(21) Appl. No.: 16/997,361

(22) Filed: Aug. 19, 2020

(65) Prior Publication Data

US 2021/0051837 A1    Feb. 25, 2021

Related U.S. Application Data

(60) Provisional application No. 62/888,615, filed on Aug. 19, 2019.

(51) Int. Cl.
*A01B 69/08*     (2006.01)
*A01B 59/00*     (2006.01)
(Continued)

(52) U.S. Cl.
CPC .......... *A01B 69/006* (2013.01); *A01B 59/004* (2013.01); *A01B 69/004* (2013.01); *A01B 73/065* (2013.01); *A01B 59/042* (2013.01)

(58) Field of Classification Search
CPC ... A01B 69/006; A01B 69/004; A01B 59/004; A01B 59/042; A01B 73/065
See application file for complete search history.

(56) References Cited

U.S. PATENT DOCUMENTS 4,077,651 A    3/1978   Steinbach et al.
4,155,417 A    5/1979   Ziems
       (Continued)

FOREIGN PATENT DOCUMENTS

AU     2016287397 B2    6/2016
CN     108362267 A     8/2018
       (Continued)

OTHER PUBLICATIONS

Muller-Elektronik GMBH & CO.KG, "Installation and Users Guide Trail-Control II", Sep. 1, 2010, Published in: Germany.
(Continued)

*Primary Examiner* — Tara Mayo
(74) *Attorney, Agent, or Firm* — DENTONS DAVIS BROWN PC; Matthew Warner-Blankenship; Kassandra Ricklefs

(57) ABSTRACT

A steerable toolbar system including a steerable implement. The steerable implement including a toolbar in operable communication with a first end of a hitch, at least one link extending between a second end of the hitch and the toolbar, at least one actuator in communication with the at least one link, and a pivot disposed at a connection point between the hitch and the toolbar. The system also including a controller in electronic communication with the at least one actuator, where the controller is configured to adjust the angle of the toolbar relative to the hitch via actuation of the at least one actuator.

13 Claims, 13 Drawing Sheets

(51) Int. Cl.

| | |
|---|---|
| *A01B 59/042* | (2006.01) |
| *A01B 69/00* | (2006.01) |
| *A01B 73/06* | (2006.01) |

(56) References Cited

U.S. PATENT DOCUMENTS

| | | | |
|---|---|---|---|
| 4,166,349 A | 9/1979 | Coenenberg | |
| 4,197,690 A | 4/1980 | Eistert | |
| 4,319,643 A * | 3/1982 | Carter et al. | A01B 73/065 |
| | | | 172/311 |
| 4,482,960 A | 11/1984 | Pryor | |
| 4,508,176 A * | 4/1985 | Wiegardt et al. | G05G 1/04 |
| | | | 200/61.54 |
| 4,967,362 A | 10/1990 | Schutten | |
| 5,143,159 A * | 9/1992 | Young et al. | A01B 63/112 |
| | | | 172/7 |
| 5,240,079 A * | 8/1993 | Schmidt | A01D 33/00 |
| | | | 280/412 |
| 5,253,172 A | 10/1993 | Ito | |
| 5,264,709 A | 11/1993 | Kamimura | |
| 5,279,068 A | 1/1994 | Rees et al. | |
| 5,471,391 A | 11/1995 | Gudat et al. | |
| 5,585,626 A | 12/1996 | Beck | |
| 5,646,844 A | 7/1997 | Gudat et al. | |
| 5,837,997 A | 11/1998 | Beck et al. | |
| 5,995,902 A | 11/1999 | Monson | |
| 6,058,343 A | 5/2000 | Orbach | |
| 6,089,344 A | 7/2000 | Baughn | |
| 6,198,992 B1 | 3/2001 | Winslow | |
| 6,236,936 B1 | 5/2001 | Berstis et al. | |
| 6,275,771 B1 | 8/2001 | Berstis et al. | |
| 6,338,023 B1 | 1/2002 | Bourgeois | |
| 6,463,374 B1 | 10/2002 | Keller | |
| 6,484,078 B1 | 11/2002 | Kageyama | |
| 6,490,539 B1 | 12/2002 | Ukai | |
| 6,501,422 B1 | 12/2002 | Nichols | |
| 6,529,823 B1 | 3/2003 | Berstis et al. | |
| 6,686,951 B1 | 2/2004 | Dickson | |
| 6,732,024 B2 | 5/2004 | Rekow | |
| 6,741,921 B2 | 5/2004 | Cohen et al. | |
| 6,856,879 B2 | 2/2005 | Arakawa et al. | |
| 6,917,300 B2 | 7/2005 | Allen | |
| 6,943,824 B2 | 9/2005 | Alexia et al. | |
| 6,946,824 B2 | 9/2005 | Waizman et al. | |
| 7,171,769 B2 | 2/2007 | Schultz | |
| 7,256,388 B2 | 8/2007 | Eglington et al. | |
| 7,349,779 B2 | 3/2008 | Nelson | |
| 7,350,806 B2 | 4/2008 | Ridolfi | |
| 7,360,623 B2 | 4/2008 | Green et al. | |
| 7,369,924 B2 | 5/2008 | Han | |
| 7,628,239 B1 | 12/2009 | Louie | |
| 7,648,004 B1 | 1/2010 | Larouche et al. | |
| 7,734,386 B2 | 6/2010 | DelNero et al. | |
| 7,777,615 B2 | 8/2010 | Okuda | |
| 8,078,338 B2 | 12/2011 | Pack | |
| 8,126,620 B2 | 2/2012 | Ringwald et al. | |
| 8,180,514 B2 | 5/2012 | Kaprielian et al. | |
| 8,195,342 B2 | 6/2012 | Anderson | |
| 8,214,111 B2 | 7/2012 | Heiniger | |
| 8,230,964 B2 | 7/2012 | Markfort | |
| 8,392,065 B2 | 3/2013 | Tolstedt | |
| 8,437,901 B2 | 5/2013 | Anderson | |
| 8,494,726 B2 | 7/2013 | Peake | |
| 8,498,788 B2 | 7/2013 | Kondekar | |
| 8,589,013 B2 | 11/2013 | Pieper et al. | |
| 8,605,947 B2 | 12/2013 | Zhang | |
| 8,634,993 B2 | 1/2014 | McClure | |
| 8,639,408 B2 | 1/2014 | Anderson | |
| 8,706,394 B2 | 4/2014 | Trepagnier et al. | |
| 8,781,658 B2 | 7/2014 | Simonini | |
| 8,781,685 B2 | 7/2014 | McClure | |
| 8,814,640 B2 | 8/2014 | Behnke et al. | |
| 8,892,308 B2 | 11/2014 | Davis | |
| 9,002,565 B2 | 4/2015 | Jones et al. | |
| 9,020,757 B2 | 4/2015 | Peake | |
| 9,043,096 B2 | 5/2015 | Zielke | |
| 9,052,714 B2 | 6/2015 | Creasey et al. | |
| 9,098,085 B2 | 8/2015 | Aznavorian et al. | |
| 9,129,523 B2 | 9/2015 | Martin | |
| 9,162,703 B2 | 10/2015 | Miller et al. | |
| 9,188,986 B2 | 11/2015 | Baumann | |
| 9,213,905 B2 | 12/2015 | Lange et al. | |
| 9,265,187 B2 | 2/2016 | Cavender-Bares et al. | |
| 9,374,940 B2 | 6/2016 | Nelson | |
| 9,392,743 B2 | 7/2016 | Camacho-Cook et al. | |
| 9,393,990 B2 | 7/2016 | Davis | |
| 9,417,120 B2 | 8/2016 | Zielke | |
| 9,420,203 B2 | 8/2016 | Broggi et al. | |
| 9,420,737 B2 | 8/2016 | Trimble | |
| 9,423,509 B2 | 8/2016 | Georgy | |
| 9,446,791 B2 | 9/2016 | Nelson, Jr. | |
| 9,451,367 B2 | 9/2016 | Basseas et al. | |
| 9,464,913 B2 | 10/2016 | Brown et al. | |
| 9,489,576 B2 | 11/2016 | Johnson | |
| 9,503,850 B2 | 11/2016 | Sheha | |
| 9,510,498 B2 | 12/2016 | Tuttle et al. | |
| 9,527,211 B2 | 12/2016 | Posselius et al. | |
| 9,545,048 B2 | 1/2017 | Pickett et al. | |
| 9,582,002 B2 | 2/2017 | Cavender-Bares | |
| 9,615,497 B2 | 4/2017 | Bassett et al. | |
| 9,675,008 B1 | 6/2017 | Rusciolelli et al. | |
| 9,750,173 B2 | 9/2017 | Dix | |
| 9,795,074 B2 | 10/2017 | Stratton | |
| 9,804,603 B1 | 10/2017 | Yegerlehner | |
| 9,807,934 B2 | 11/2017 | Busciolelli et al. | |
| 9,840,003 B2 | 12/2017 | Stzatmary | |
| 9,849,828 B2 | 12/2017 | Foster et al. | |
| 9,857,478 B2 | 1/2018 | Joughin | |
| 9,861,040 B2 | 1/2018 | Bonefas | |
| 9,880,560 B2 | 1/2018 | Han | |
| 9,898,688 B2 | 2/2018 | Bleiweiss | |
| 9,936,637 B2 | 4/2018 | Anderson | |
| 9,964,559 B2 | 5/2018 | Zielke | |
| 9,996,081 B2 | 6/2018 | Owens | |
| 10,065,722 B1 | 9/2018 | Jaszewski et al. | |
| 10,099,609 B2 | 10/2018 | Pagliani | |
| 10,104,822 B2 | 10/2018 | Couchman | |
| 10,104,827 B2 | 10/2018 | Adamchuk et al. | |
| 10,114,378 B2 | 10/2018 | Korthals et al. | |
| 10,130,022 B2 | 11/2018 | Blackwell et al. | |
| 10,131,376 B2 | 11/2018 | Mortimer | |
| 10,143,126 B2 | 12/2018 | Foster et al. | |
| 10,152,891 B2 | 12/2018 | Rusciolelli et al. | |
| 10,165,722 B2 | 1/2019 | Ackerman et al. | |
| 10,168,714 B2 | 1/2019 | Webber | |
| 10,206,324 B2 | 2/2019 | Gerrish | |
| 10,215,572 B2 | 2/2019 | Urano et al. | |
| 10,246,087 B2 | 4/2019 | Mitchell et al. | |
| 10,254,765 B2 | 4/2019 | Rekow et al. | |
| 10,255,670 B1 | 4/2019 | Wu et al. | |
| 10,264,431 B2 | 4/2019 | Vandapel et al. | |
| 10,267,820 B2 | 4/2019 | Zielke et al. | |
| 10,272,940 B2 | 4/2019 | Staehle | |
| 10,299,422 B2 | 5/2019 | Schleicher | |
| 10,324,471 B2 | 6/2019 | Etoh | |
| 10,328,934 B2 | 6/2019 | Minster | |
| 10,338,594 B2 | 7/2019 | Long | |
| 10,365,404 B2 | 7/2019 | Collins | |
| 10,384,709 B2 | 8/2019 | Joughin | |
| 10,398,084 B2 | 9/2019 | Ray et al. | |
| 10,407,873 B2 | 9/2019 | Ono | |
| 10,412,893 B2 | 9/2019 | Missotten et al. | |
| 10,479,354 B2 | 11/2019 | Posselius | |
| 10,491,879 B2 | 11/2019 | Redden | |
| 10,531,603 B2 | 1/2020 | Errari et al. | |
| 10,551,844 B2 | 2/2020 | Biber et al. | |
| 10,575,453 B2 | 3/2020 | Blackwell | |
| 10,583,832 B2 | 3/2020 | Foster | |
| 10,612,932 B2 | 4/2020 | Sunil Kumar | |
| 10,633,023 B2 | 4/2020 | Ghannam | |
| 10,635,110 B2 | 4/2020 | Shashua | |
| 10,684,305 B2 | 6/2020 | Zielke et al. | |
| 10,696,227 B2 | 6/2020 | Stein | |
| 10,698,402 B2 | 6/2020 | Kosa et al. | |

(56) References Cited

U.S. PATENT DOCUMENTS

| | | | |
|---|---|---|---|
| 10,747,233 B2 | 8/2020 | Ogura | |
| 10,780,930 B1 | 9/2020 | Kentley-Klay | |
| 10,788,835 B2 | 9/2020 | Hurd et al. | |
| 10,795,351 B2 | 10/2020 | Hurd | |
| 10,820,508 B2 | 11/2020 | Dix | |
| 10,822,017 B2 | 11/2020 | Tan | |
| 10,845,810 B2 | 11/2020 | Flajolet | |
| 10,912,247 B2 | 2/2021 | Wolters | |
| 10,962,376 B2 | 3/2021 | Fong et al. | |
| 10,966,369 B2 | 4/2021 | Suleman | |
| 11,006,564 B2 | 5/2021 | Foster | |
| 11,091,192 B2 | 8/2021 | McMickell | |
| 11,092,696 B2 | 8/2021 | Eriksson | |
| 11,093,745 B2 | 8/2021 | Redden | |
| 11,212,954 B2 | 1/2022 | Maeder | |
| 11,315,258 B1 | 4/2022 | Anagnostopoulos | |
| 11,429,114 B2 | 8/2022 | Davis | |
| 11,612,096 B2 | 3/2023 | Sivinski | |
| 11,697,414 B2 | 7/2023 | Simmons | |
| 11,790,539 B1 | 10/2023 | Anagnostopoulos | |
| 2001/0048755 A1 | 12/2001 | Wiens | |
| 2002/0059320 A1 | 5/2002 | Tamaru | |
| 2002/0072850 A1 | 6/2002 | McClure | |
| 2003/0023353 A1 | 1/2003 | Badarneh | |
| 2003/0085042 A1* | 5/2003 | Rogala | B60G 17/005 |
| | | | 172/2 |
| 2003/0187577 A1 | 10/2003 | McClure | |
| 2004/0004544 A1 | 1/2004 | Scott | |
| 2004/0015835 A1 | 1/2004 | Kotnur et al. | |
| 2004/0264761 A1 | 12/2004 | Mas | |
| 2005/0074143 A1 | 4/2005 | Kawai | |
| 2006/0178825 A1 | 8/2006 | Eglington | |
| 2007/0021913 A1 | 1/2007 | Heiniger | |
| 2007/0071311 A1 | 3/2007 | Rovira-Mas | |
| 2007/0112700 A1 | 5/2007 | Den Haan | |
| 2008/0103690 A1 | 5/2008 | Dix | |
| 2008/0141814 A1 | 6/2008 | Markfort | |
| 2008/0215203 A1 | 9/2008 | Dix | |
| 2008/0269956 A1 | 10/2008 | Dix | |
| 2008/0306655 A1 | 12/2008 | Dickson | |
| 2009/0037041 A1 | 2/2009 | Senneff | |
| 2009/0099730 A1 | 4/2009 | McClure | |
| 2009/0112410 A1 | 4/2009 | Shull | |
| 2009/0118904 A1 | 5/2009 | Birnie | |
| 2010/0006308 A1* | 1/2010 | Schmidt et al. | A01B 69/004 |
| | | | 172/1 |
| 2010/0026555 A1 | 2/2010 | Whittaker | |
| 2010/0032492 A1 | 2/2010 | Grimm | |
| 2010/0094481 A1 | 4/2010 | Anderson | |
| 2011/0056753 A1 | 3/2011 | Middlemiss | |
| 2011/0056762 A1 | 3/2011 | Markfort | |
| 2011/0098890 A1 | 4/2011 | Lee | |
| 2011/0196565 A1 | 8/2011 | Collins | |
| 2011/0235923 A1 | 9/2011 | Weisenburger | |
| 2011/0307149 A1 | 12/2011 | Pighi | |
| 2012/0050023 A1 | 3/2012 | Sauder | |
| 2012/0130593 A1 | 5/2012 | Davis | |
| 2012/0200697 A1 | 8/2012 | Wuestefeld | |
| 2012/0215410 A1 | 8/2012 | McClure | |
| 2013/0131925 A1 | 5/2013 | Isaji | |
| 2013/0186657 A1* | 7/2013 | Kormann et al. | A01B 69/004 |
| | | | 172/278 |
| 2013/0317696 A1 | 11/2013 | Koch | |
| 2014/0116735 A1 | 5/2014 | Bassett | |
| 2014/0163806 A1 | 6/2014 | Aznavorian | |
| 2014/0324291 A1 | 10/2014 | Jones | |
| 2015/0041238 A1 | 2/2015 | Davis | |
| 2015/0081156 A1 | 3/2015 | Trepagnier | |
| 2015/0237795 A1 | 8/2015 | Koch | |
| 2015/0264866 A1 | 9/2015 | Foster | |
| 2015/0343403 A1 | 12/2015 | Ruhland | |
| 2015/0359163 A1 | 12/2015 | Nelson | |
| 2016/0214643 A1 | 7/2016 | Joughin | |
| 2016/0229555 A1 | 8/2016 | Millin | |
| 2016/0280250 A1 | 9/2016 | Stahle | |
| 2017/0016870 A1 | 1/2017 | McPeek | |
| 2017/0102702 A1 | 4/2017 | Ishijima | |
| 2017/0135277 A1 | 5/2017 | Hiramatsu | |
| 2017/0147005 A1 | 5/2017 | Ramm | |
| 2017/0242095 A1 | 8/2017 | Schuh | |
| 2017/0248963 A1 | 8/2017 | Levinson et al. | |
| 2017/0249517 A1 | 8/2017 | Cho | |
| 2017/0297621 A1 | 10/2017 | Bunderson | |
| 2017/0357267 A1 | 12/2017 | Foster et al. | |
| 2017/0359941 A1 | 12/2017 | Czapka | |
| 2018/0017965 A1 | 1/2018 | Kosa | |
| 2018/0024549 A1 | 1/2018 | Hurd | |
| 2018/0068416 A1 | 3/2018 | Chandra | |
| 2018/0081058 A1 | 3/2018 | Kalscheur | |
| 2018/0084727 A1 | 3/2018 | Andrios | |
| 2018/0096605 A1 | 4/2018 | Bai | |
| 2018/0201299 A1 | 7/2018 | Ashtari | |
| 2018/0216942 A1 | 8/2018 | Wang | |
| 2018/0238730 A1 | 8/2018 | Meier | |
| 2018/0326982 A1 | 11/2018 | Paris | |
| 2018/0329415 A1 | 11/2018 | Aoi | |
| 2019/0021211 A1 | 1/2019 | Gutknecht | |
| 2019/0039626 A1 | 2/2019 | Hatano | |
| 2019/0071092 A1 | 3/2019 | Ma | |
| 2019/0075706 A1 | 3/2019 | Cavender-Bares et al. | |
| 2019/0090472 A1 | 3/2019 | Crinklaw et al. | |
| 2019/0124822 A1* | 5/2019 | Czapka et al. | A01B 73/067 |
| 2019/0133024 A1 | 5/2019 | Gerrish | |
| 2019/0146511 A1 | 5/2019 | Hurd et al. | |
| 2019/0174667 A1 | 6/2019 | Gresch et al. | |
| 2019/0275939 A1 | 9/2019 | Kim | |
| 2019/0302799 A1 | 10/2019 | Schaff | |
| 2019/0343035 A1 | 11/2019 | Smith | |
| 2019/0373801 A1 | 12/2019 | Schoeny | |
| 2020/0023835 A1 | 1/2020 | Harda | |
| 2020/0029487 A1 | 1/2020 | Dix | |
| 2020/0033143 A1 | 1/2020 | Hiramatsu | |
| 2020/0084951 A1 | 3/2020 | Fanshier | |
| 2020/0100421 A1 | 4/2020 | Wang | |
| 2020/0128734 A1 | 4/2020 | Brammeier | |
| 2020/0133262 A1 | 4/2020 | Suleman | |
| 2020/0150673 A1 | 5/2020 | Qiu | |
| 2020/0178455 A1 | 6/2020 | Ishikawa | |
| 2020/0193589 A1 | 6/2020 | Peshlov et al. | |
| 2020/0231210 A1 | 7/2020 | Anderson | |
| 2020/0319655 A1 | 10/2020 | Desai | |
| 2020/0352082 A1 | 11/2020 | Maeder et al. | |
| 2020/0352088 A1 | 11/2020 | Arnett | |
| 2021/0000006 A1 | 1/2021 | Ellaboudy | |
| 2021/0003416 A1 | 1/2021 | Wilson et al. | |
| 2021/0026362 A1 | 1/2021 | Wilson et al. | |
| 2021/0051837 A1 | 2/2021 | Barry et al. | |
| 2021/0053561 A1 | 2/2021 | Beller | |
| 2021/0094539 A1 | 4/2021 | Beller | |
| 2021/0132618 A1 | 5/2021 | Van Roekel | |
| 2021/0161060 A1 | 6/2021 | Kaufmann | |
| 2021/0185882 A1 | 6/2021 | Eichhorn | |
| 2021/0195824 A1 | 7/2021 | Van Roekel | |
| 2021/0195840 A1 | 7/2021 | Puryk | |
| 2021/0289707 A1 | 9/2021 | Schloesser | |
| 2021/0294337 A1 | 9/2021 | Van Mill | |
| 2021/0315147 A1 | 10/2021 | Fanshier | |
| 2021/0364631 A1 | 11/2021 | Hasegawa et al. | |
| 2021/0365036 A1 | 11/2021 | Dix | |
| 2021/0396528 A1 | 12/2021 | St. Romain | |
| 2022/0011444 A1 | 1/2022 | Eichhorn et al. | |
| 2022/0019240 A1 | 1/2022 | Christiansen | |
| 2022/0026226 A1 | 1/2022 | Eichhorn | |
| 2022/0061202 A1 | 3/2022 | Holoubek et al. | |
| 2022/0078975 A1 | 3/2022 | Slichter | |
| 2022/0105932 A1 | 4/2022 | Omikawa | |
| 2022/0130145 A1 | 4/2022 | Connary | |
| 2022/0232759 A1 | 7/2022 | Sauder | |
| 2022/0272888 A1 | 9/2022 | Hodel | |
| 2022/0284669 A1 | 9/2022 | Heinonen | |
| 2022/0317688 A1 | 10/2022 | Li | |
| 2022/0332365 A1 | 10/2022 | Calderon | |
| 2022/0363280 A1 | 11/2022 | Calderon | |
| 2022/0365163 A1 | 11/2022 | Baek | |

(56) References Cited

U.S. PATENT DOCUMENTS

| | | | |
|---|---|---|---|
| 2022/0386527 A1 | 12/2022 | Schleicher | |
| 2022/0410704 A1 | 12/2022 | O'Connor | |
| 2023/0124026 A1 | 4/2023 | Hansen | |
| 2023/0229163 A1 | 7/2023 | Rust | |
| 2023/0230202 A1 | 7/2023 | Eichhorn et al. | |
| 2023/0270039 A1 | 8/2023 | Fanshier | |
| 2023/0292664 A1 | 9/2023 | Zielke et al. | |
| 2024/0000011 A1 | 1/2024 | Zielke et al. | |
| 2024/0044346 A1 | 2/2024 | Barry et al. | |
| 2024/0053759 A1 | 2/2024 | Wilson | |
| 2024/0381803 A1 | 11/2024 | Wagner | |
| 2024/0389494 A1 | 11/2024 | Vorobiev | |
| 2025/0002070 A1 | 1/2025 | Brand | |
| 2025/0008874 A1 | 1/2025 | Townsend | |
| 2025/0169390 A1 | 5/2025 | Eichhorn | |
| 2025/0241246 A1 | 7/2025 | Woodcock | |
| 2025/0362373 A1 | 11/2025 | Calderon | |
| 2026/0041024 A1 | 2/2026 | Risius | |
| 2026/0083057 A1 | 3/2026 | Zielke | |
| 2026/0084616 A1 | 3/2026 | Wilson | |

FOREIGN PATENT DOCUMENTS

| | | | |
|---|---|---|---|
| DE | 102013203549 A1 | 9/2014 | |
| EP | 1773647 B1 | 2/2010 | |
| EP | 2511152 A1 | 11/2013 | |
| JP | 2017211733 A | 11/2017 | |
| JP | 2021101303 A | 7/2021 | |
| JP | 2022060934 A | 4/2022 | |
| KR | 101728137 B1 | 4/2017 | |
| NO | 861970 L | 11/1986 | |
| WO | 2012027364 A2 | 3/2012 | |
| WO | 2017004074 A1 | 1/2017 | |
| WO | 2017074863 A1 | 5/2017 | |
| WO | 2018055921 A1 | 3/2018 | |
| WO | 2018165199 A4 | 9/2018 | |
| WO | 2019042956 A1 | 3/2019 | |

OTHER PUBLICATIONS

Unverferth MFG. CO., INC., "Top Air Steerable Hitch", , Published in: Kalida, OH.

Barry et al., "Accuracy of UAV Photogrammetry Compared with Network RTK GPS", 2013, Publisher: Baseline Surveys Ltd., Published in: IE.

English et al., "Vision Based Guidance for robot Navigation in Agriculture", 2014.

"Machine Sync Activation", https://www.deere.com/en/technology-products/precision-ag-technology/guidancemachine-sync/, Unknown—available as early as 2018, Publisher: John Deere US.

Mulakala, "Measurement Accuracy of the DJI Phantom 4 RTK & Photogrammetry", Unknown—available as early as 2019, pp. 1-18, Publisher: DroneDeploy.

Rankin et al., "Daytime Mud Detection for Unmanned Ground Vehicle at Autonomous Navigation", Unknown—available as early as 2008, pp. 1-9, Publisher: Jet Propulsion Laboratory, California Institute of Technology.

Unverferth MFG., "Top Air Steerable Hitch", Unknown—available as early as 2016, Published in: Kalida, OH.

Pajares et al., "Machine-Vision Systems Selection for Agricultural Vehicles: A Guide", Journal of Imaging, Nov. 22, 2016, pp. 1-31, vol. 2, No. 34, Publisher: MDPI.

"Dp RTK/PPK drones give you better results GCPs?", https://www.pix4d.com/blog/why-ground-control-points-important, Aug. 26, 2017, Publisher: PIX4D.

Reid, "Precision Guidance of Agricultural Vehicles", 1998, pp. 1-10.

Rovira-Mas et al., "Stereo vision three-dimensional terrain maps for precision agriculture", computers and electronics in agriculture, 2008, pp. 133-143, Publisher: ScienceDirect.

Saarinen et al., "SD Normal Distributions Transform Occupancy Maps: An Efficient Representation for Mapping in Dynamic Environments", Mapping in 3D Environments, , pp. 1-24.

Subramanian et al., "Development of machine vision and laser radar based autonomous vehicle guidance systems for citrus grove navigation", Computers and Electronics in Agriculture, 2006, pp. 130-143, No. 53, Publisher: ScienceDirect.

Raven Precision, "Viper 4+ and Job Sync", Aug. 7, 2018, Youtube.

Bruns, "Thesis—Lidar-based Vehicle Localization in an Autonomous Valet Parking Scenario", 2016, Publisher: The Ohio State University.

Cho et al., "Autonomous speed sprayer guidance using machine vision and fuzzy logic", 1999, pp. 1137-1143, vol. 42, No. 4, Publisher: Transactions of the ASAE.

Im et al., "Parking Line Based SLAM Approach Using AVM/LiDAR Sensor Fusion for Rapid and Accurate Loop losing and Parking Space Detection", Sensors, Nov. 5, 2019, pp. 1-17, Publisher: MDPI.

Leonard et al., "Dynamic Map Building for an Autonomous Mobile Robot", Aug. 1992, pp. 4, No. 11, Publisher: The International Journal of Robotics.

Muller Elektronik GMBH & CO. KG, "Installation and Operating Instructions Trail-Control Manufacturer", Mar. 2001, Published in: Germany.

Muller-Elektronik GMBH & CO.KG, "Hardi Auto-Track Instruction Book", Jan. 10, 1996, Published in: Germany.

Muller Elektronik, "Installation and Users Guide Trail-Control II", Sep. 1, 2010, Published in: DE.

"Ground control points: why are they important?", https://www.pix4d.com/blog/why-ground-control-points-important, Dec. 3, 2019, Publisher: PIX4D.

Dronedeploy, Measurement Accuracy of the DJI Phantom 4 RTK & Photogrammetry, J. Mulakala, 2019.

English-2014, Vision Based guidance for robot navigation in agriculture, Andrew English et al., Jun. 7, 2014.

P. Barry and R. Coakley, 2015, Accuracy of UAV Photogrammetry Compared with Network Rtk Gps.

Pix4d, How to Calibrate a perspective lens camera, https://support.pix4d.com/hc/en-us/articles/206065716-How-to-calibrate-a-Perspective-Lens-Camera, Unknown—available as early as 2017.

Rankin 2008, Daytime mud detection for unmanned ground vehicle autonomous navigation, A.L. Rankin and L. H. Matthies, 2008.

Unverferth MFG. Co., Inc., "Top Air Steerable Hitch", Unknown—available as early as 2016, Published in: Kalida, OH.

Ehab Ghanem, Kyle O'Keefe, and Richard Klukas. Testing vehicle-to-vehicle relative position and at-titude estimation using multiple uwb ranging. In 2020 IEEE 92nd Vehicular Technology Conference (VTC2020-Fall), pp. 1-5. IEEE, 2020.

OnTrac3—PN2006236, 2014.

Wei Jiang, Zhuojian Cao, Baigen Cai, Binghao Li, and Jian Wang. Indoor and outdoor seamless po-sitioning method using uwb enhanced multi-sensor tightly-coupled integration. IEEE Transactions on Vehicular Technology, 70 (10): 10633-10645, 2021.

Yu Xianjia, Li Qingqing, Jorge Pena Queralta, Jukka Heikkonen, and Tomi Westerlund. Cooperative uwb-based localization for outdoors positioning and nav-igation of uavs aided by ground robots. In 2021 IEEE International Conference on Autonomous Sys-tems (ICAS), pp. 1-5. IEEE, 2021.

John Deere Machine Sync—Machine Sync Activation, https://www.deere.com/en/technology-products/precision-ag-technology/guidance/machine-sync/, Unknown—available as early as 2018, Publisher: John Deere.

John Deere—Auto Trac Universal (ATU) Steering Kit, 2007, https://usermanual.wiki/John-Deere/JohnDeerePc20864UsersManual465898.2065122472.pdf.

Orthman—Tracker implement guidance—Date Unknown, available as early as 2012—https://www.facebook.com/orthmanag/videos/tracker-implement-guidance/3057072390855/.

Raven Industries—Direcsteer, Date Unknown, available as early as 2023, https://www.ravenind.com/products/guidance/direcsteer.

Raven Industries—SmartTrax MD Installation Manual, 2013, https:;//bencoag.com/wp-content/uploads/Raven-docs/016-5030-021-A%20-%20SmarTrax%20MD%20-%20Installation%20Manual.pdf.

(56) References Cited

OTHER PUBLICATIONS

SUNCO Farm Equipment—Pull Implement Guidance, Date Unknown, available as early as 2016, https://www.farm-equipment.com/articles/13843-sunco-implement-guidance-hitch.

John Deere FarmSight—Active Implement Guidance, Date Unknown, available as early as 2013—https://www.youtube.com/watch?v=JqBM1hH_MBs.

Trimble—EZ-Pilot Pro Guidance System, 2018, https://ww2.agriculture.trimble.com/product/ez-pilot-pro-guidance-system/.

Trimble—EZ-Steer System, 2010, https://ww2.agriculture.trimble.com/product/ez-steer-assisted-steering-system/.

Anand et al., "AgriSegNet: Deep Aerial Semantic Segmentation Framework for IoT-Assisted Precision Agriculture", IEEE Sensors Journal, 2021, pp. 17581-17590, vol. 21, No. 16, https://www.researchgate.net/publication/350602141_AgriSegNet_Deep_Aerial_Semantic_Segmentation_Framework_for_IoT-Assisted_Precision_Agriculture.

Bhagat et al., "MS-Net: A CNN Architecture for Agriculture Pattern Segmentation in Aerial Images", 2022, Publisher: Cham: Springer International Publishing, https://link.springer.com/chapter/10.1007/978-3-031-11346-8_42.

Imai et al., "Shadow detection in hyperspectral images acquired by UAV", The International Archives of Photogrammetry, Remote Sensing and Spatial Information Sciences, 2019, pp. 371-377, https://isprs-archives.copernicus.org/articles/XLII-2-W13/371/2019/isprs-archives-XLII-2-W13-371-2019.pdf.

Innani et al., "Fuse-pn: A novel architecture for anomaly pattern segmentation in aerial agricultural images", 2021, https://ieeexplore.IEEE.org/document/9522774.

Shrestha et al., "Automatic Corn Plant Population Measurement Using Machine Vision", Agricultural and Biosystems Engineering Conference Proceedings and Presentations., 2001, No. 37, https://dr.lib.iastate.edu/entities/publication/2662d8c6-8b57-43a5-a7d5-4a946c737af3.

Tang et al., "Plant Identification in Mosaicked Crop Row Images for Automatic Emerged Corn Plant Spacing Measurement", 2008, pp. 2181-2191, https://www.researchgate.net/publication/285653699_Plant_Identification_in_Mosaicked_Crop_Row_Images_for_Automatic_Emerged_Corn_Plant_Spacing_Measurement.

Thorp et al., "Using Aerial Hyperspectral Remote Sensing Imagery to Estimate Corn Plant Stand Density", 2008, pp. 311-320, https://elibrary.asabe.org/abstract.asp?aid=24207.

AutoFarm—OnTrac2, Date Unknown, available as early as 2009, https://www.farmprogress.com/farming-equipment/autofarm-introduces-ontrac2-gps-assisted-steering-system.

Ashley Napier, Paul Newman, "Generation and Exploitation of Local Orthographic Imagery for Road Vehicle Localisation", 2012, 2012 IEEE Intelligent Vehicles Sysmposium, pp. 590-596, DOI: 10.1109/IVS.2012.6232165.

GameMaker Community—https://forum.gamemaker.io/index.php?threads/sprite-real-time-multi-recoloring-using-shaders.12601, 2016.

Williams, Google Maps Review; https://web.archive.org/web/20210128011918/https://www.pcmag.com/reviews/google-maps (Year: 2021).

Agjunction—Wheelman Flex Installation Guide, Fit Kit: 810-0036-01, Date Unknown, https://manuals.handsfreefarm.com/wp-content/uploads/2021/04/Wheelman-Flex-Fit-Kit-810-0041-01-Install-Guide-Rev-B.pdf.

Case IH Active Implement Guidance—https://www.youtube.com/watch?v=Kb059Tj1Q_k, Date Unknown.

CHCNAV—ANX510 Se AutoSteer, Date Unknown, https://agriculture.chcnav.com/products/chcnav-NX510-SE.

FJDynamics—GPS Guidance Auto Steer System for Tractor, Date Unknown, https://www.fjdynamics.com/product/fjd-at2-auto-steer-system.

FJDynamics—Navigate to Next-level Efficiency—FJD AT2 Auto Steer System, Date Unknown.

John Deere—Precision Ag Technology—AutoTrac Universal 300, https://www.deere.com/en/technology-products/precision-ag-technology/guidance/auto-trac-universal-300/.

Protracker Guidance Systems—300DB Hydraulic Hitch Specifications, Date Unknown, https://protrakker.com/300DB-system/.

Raven Cart Automation, https://www.ravenind.com/products/autonomy/raven-cart-automation, Date Unknown.

Wolters, D., "Assessment of Corn Plant Population at Emergence from Processed Color Aerial Imagery", 2015.

Sunnav, AG400 Gnss Auto-Steering System, Date Unknown,.

Shrestha et al., "Shape and Size Analysis of Corn Plant Canopies for Plant Population and Spacing Sensing", 2005, pp. 295-303.

Novariant—Ontrac2+, Date Unknown, available as early as 2012.

Protracker Guidance Systems—400DB Hydraulic Hitch Specifications, Date Unknown, https://protrakker.com/400DB-system/.

* cited by examiner

APPARATUS, SYSTEMS AND METHODS FOR STEERABLE TOOLBARS

CROSS-REFERENCE TO RELATED APPLICATION(S)

This application claims the benefit under 35 U.S.C. § 119(e) to U.S. Provisional Application 62/888,615, filed Aug. 19, 2019, and entitled "Apparatus, Systems And Methods For Steerable Toolbars," which is hereby incorporated herein by reference in its entirety for all purposes.

TECHNICAL FIELD

The disclosed technology relates generally to a steerable toolbar system and in particular, to the devices, methods, and design principles allowing an implement being towed by a tractor to follow an identical path to the tractor via use of the steerable toolbar.

BACKGROUND

The disclosure relates to apparatus, systems and methods for a steerable toolbar system that enables agricultural implements to follow an identical path to the pulling tractor.

Current designs are intended to cause a toolbar to more closely track the same path as the pulling tractor. One way is to add on attachments to force the implement in one direction or the other. Another is by shifting the tractor drawbar to one side or the other to compensate for off path tracking. Yet another is by attempting to predict the amount of correction to be made by the pulling tractor and applying that amount to the tractor guidance path.

This method will build steerable functionality into the toolbar design and use working ground engagement tools to steer the implement to the desired path. A centrally located hinge pin is built into the design of the toolbar and guidance information is used to steer the toolbar relative to the center hitch so the ground engaging tools mounted on the implement cause the machine to guide right or left as it is drawn across a field. This will result in more accurate results, more responsiveness in the guidance system, less stress on the toolbar and the ground engaging tools.

This design will reduce or eliminate side load stress on ground engaging tools because the pull line is always perpendicular to the toolbar.

BRIEF SUMMARY

Discussed herein are various devices, systems and methods relating to a toolbar type implement designed to be pulled forward by a tractor and used to fertilize, plant, cultivate, etc. The toolbar machine design includes a hinge and actuators that cause it to change the angle of the toolbar section relative to the hitch section. This is then used to steer the implement as it is drawn forward using the ground engaging tools attached to the toolbar to react against the soil to counter act the effects of side hill draft and corner turns that are common with current state of the art implements. The disclosed implementations relate to both the construction of the toolbar and the overlaying control method. It will be appreciated that there are several types of position sensing methods that could be used to provide input to the control system. These could include, but are not limited to; a position receiver located on the implement, a relative hitch position sensor tied to the tractor and implement hitch, a control method that predicts the expected error to be corrected based on known factors such as turning rate, slope angle, speed and the link, or a system that measures the position of the implement as compared to the tractor.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Implementations of the described techniques may include hardware, a method or process, or computer software on a computer-accessible medium.

In Example 1, a steerable toolbar system, comprising a steerable implement comprising a toolbar in operable communication with a hitch, at least one link extending between the hitch and the toolbar, at least one actuator in communication with the at least one link, and a pivot disposed at a connection point between the hitch and the toolbar, and a controller in electronic communication with the at least one actuator, wherein the controller is configured to adjust the angle of the toolbar relative to the hitch via the at least one actuator.

In Example 2, the system of Example 1, wherein the at least one link is a telescoping link having an extended position and a retracted position.

In Example 3, the system of Example 2, wherein the at least one link is urged between the extended and retracted positions via the at least one actuator.

In Example 4, the system of Example 1, wherein the toolbar rotates about the pivot in response actuation of the at least one link.

In Example 5, the system of Example 1, further comprising a hitch position sensor in electronic communication with the controller, wherein the hitch position sensor is constructed and arranged to send signals to the controller about the position of the hitch.

In Example 6, the system of Example 1, further comprising two fold hinges constructed and arranged such that the toolbar can be folded to be substantially parallel to the hitch.

In Example 7, the system of Example 1, wherein the controller is in further communication with a guidance system.

In Example 8, an agricultural implement comprising a toolbar comprising a pin and at least one ground engaging tool, an elongate attachment, a first end of the elongate attachment attached to the toolbar via the pin, a first draft link extending between a second end of the elongate attachment and the toolbar, a first actuator in operable communication with the first draft link, wherein actuation of the first draft link via the first actuator adjusts the angle of the toolbar relative to the elongate attachment, and a controller in electronic communication with the first actuator.

In Example 9, the agricultural implement of Example 8, further comprising a position receiver disposed on the implement.

In Example 10, the agricultural implement of Example 8, further comprising a hitch position sensor disposed on a hitch.

In Example 11, the agricultural implement of Example 8, wherein the controller is in further communication with a guidance system.

In Example 12, the agricultural implement of Example 8, further comprising a second draft link extending between the second end of the elongate attachment and the toolbar and a second actuator in operable communication with the second draft link, wherein actuation of the second draft link via the second actuator adjusts the angle of the toolbar relative to the elongate attachment.

In Example 13, the agricultural implement of Example 8, further comprising a first hinge positioned on the toolbar on a first side of the pin and a second hinge positioned on toolbar on a second side of the pin.

In Example 14, the agricultural implement of Example 13, wherein the toolbar is configured to fold inward at the first and second hinges into a compact configuration.

In Example 15, a method for steering an agricultural implement comprising determining a guidance path on a controller, traversing the guidance path via a vehicle, the vehicle attached to the agricultural implement, the agricultural implement comprising an elongate bar and a hitch, adjusting the angle of the elongate bar relative to the hitch such that the agricultural implement traverses the guidance path with path fidelity.

In Example 16, the method of Example 15, further comprising storing the guidance path traveled for use in subsequent operations.

In Example 17, the method of Example 15, wherein the angle of the elongate bar is adjusted on-the-go.

In Example 18, the method of Example 15, further comprising sensing the position of the agricultural implement via at least one position sensor.

In Example 19, the method of Example 15, further comprising mapping exact locations of the vehicle and the agricultural implement during operation.

In Example 20, the method of Example 15, wherein the vehicle is a tractor and the implement is a planter.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

The various embodiments disclosed or contemplated herein relate to a steerable toolbar for use in agricultural implementations. In various implementations, the steerable toolbar described herein is utilized in conjunction with a variety of agricultural operations, such as in conjunction with fertilizer applicators, planters, cultivators and the like, as would be readily appreciated. In various implementations, the steerable toolbar system utilizes a plurality of telescopic draft links and associated actuators for movement of the steerable toolbar.

It is appreciated that the various technologies described herein can be used in conjunction with any of the innovations disclosed in co-pending U.S. application Ser. No. 16/939,785, filed Jul. 27, 2020 and U.S. application Ser. No. 16/921,828, filed Jul. 6, 2020.

Figure 1:
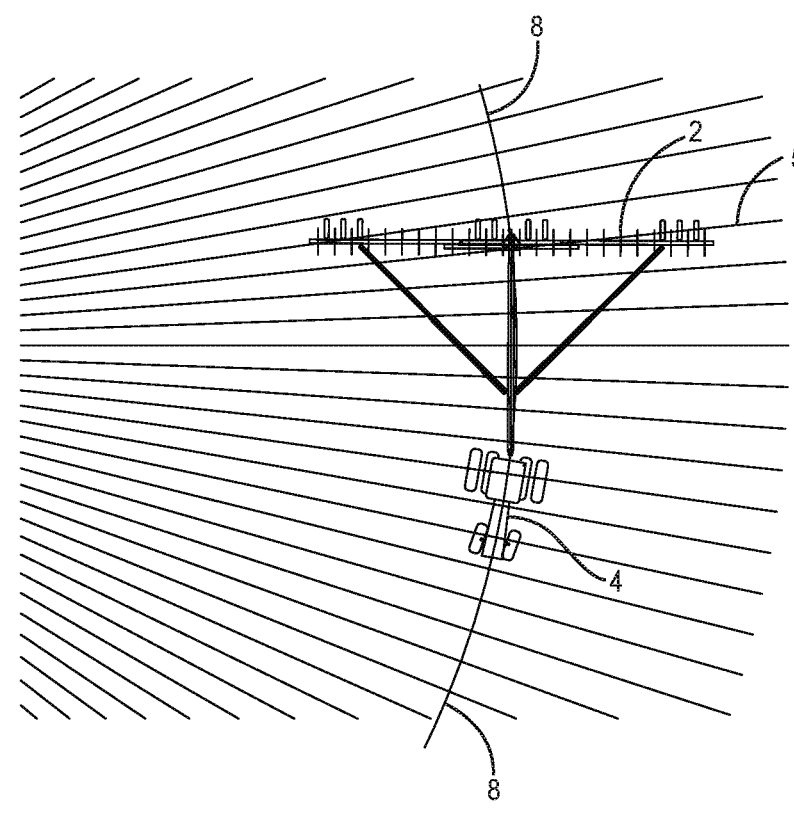
FIG. 1 is a top view of a prior art toolbar.
Figure 2:
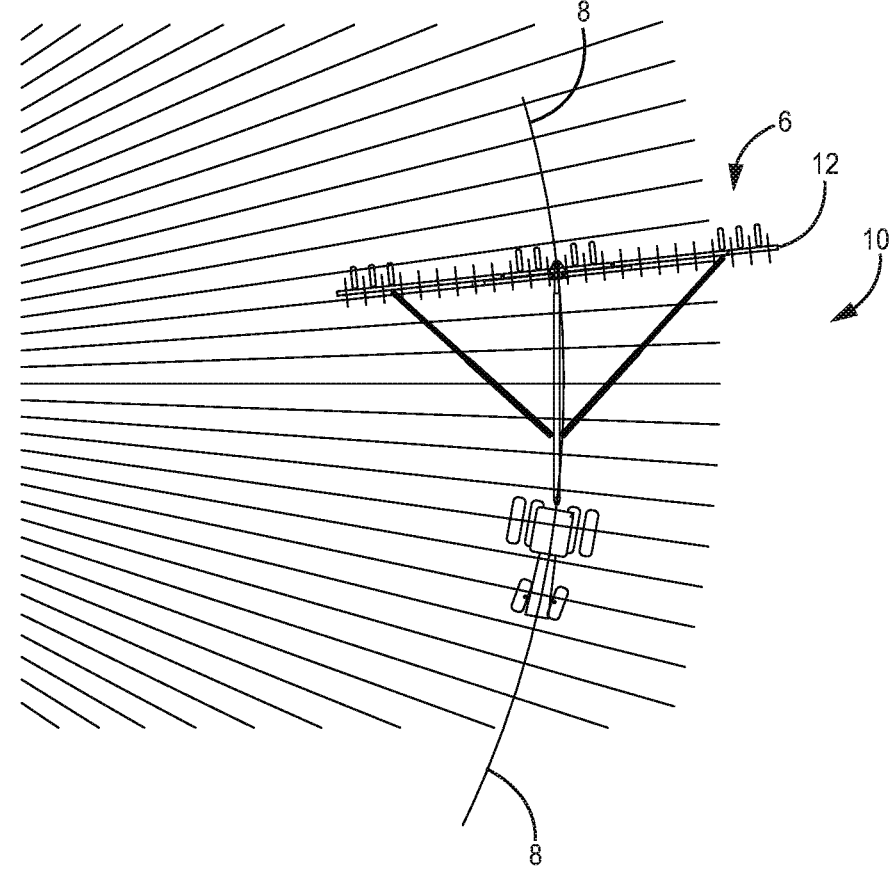
FIG. 2 is a top view of a steerable toolbar system, according to one implementation.
Figure 3A:
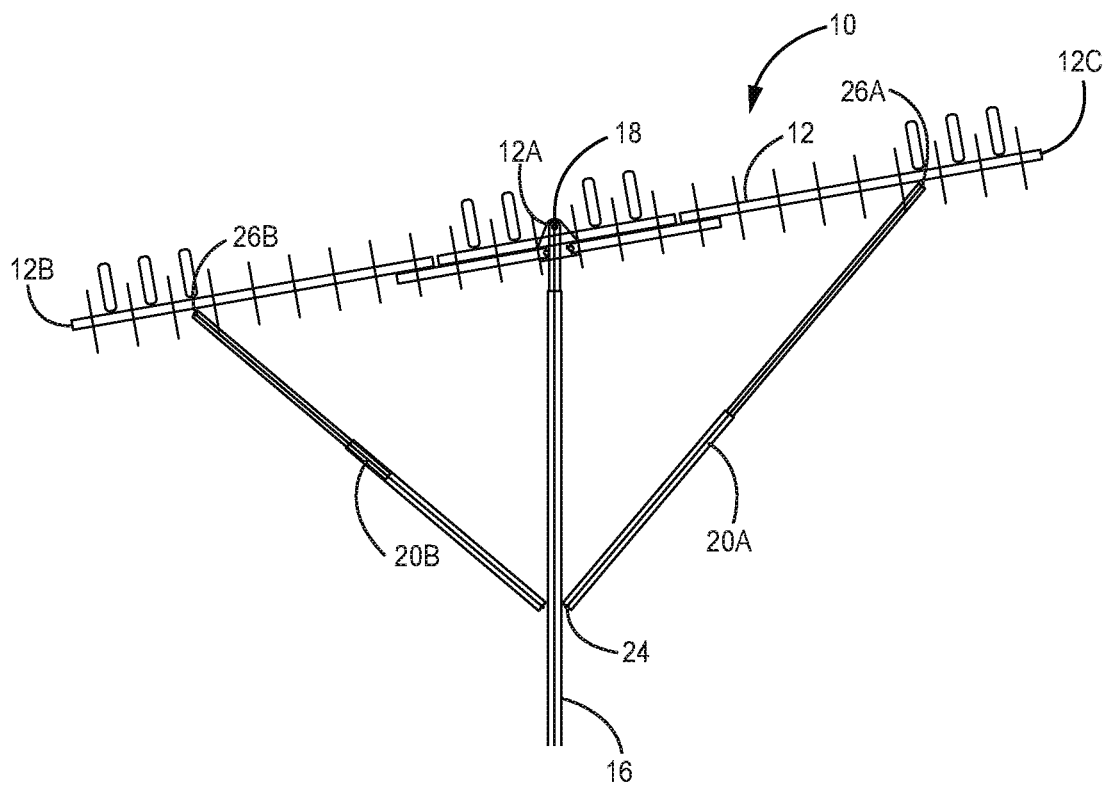
FIG. 3A is a top view of a steerable toolbar system, according to one implementation.
Figure 3B:
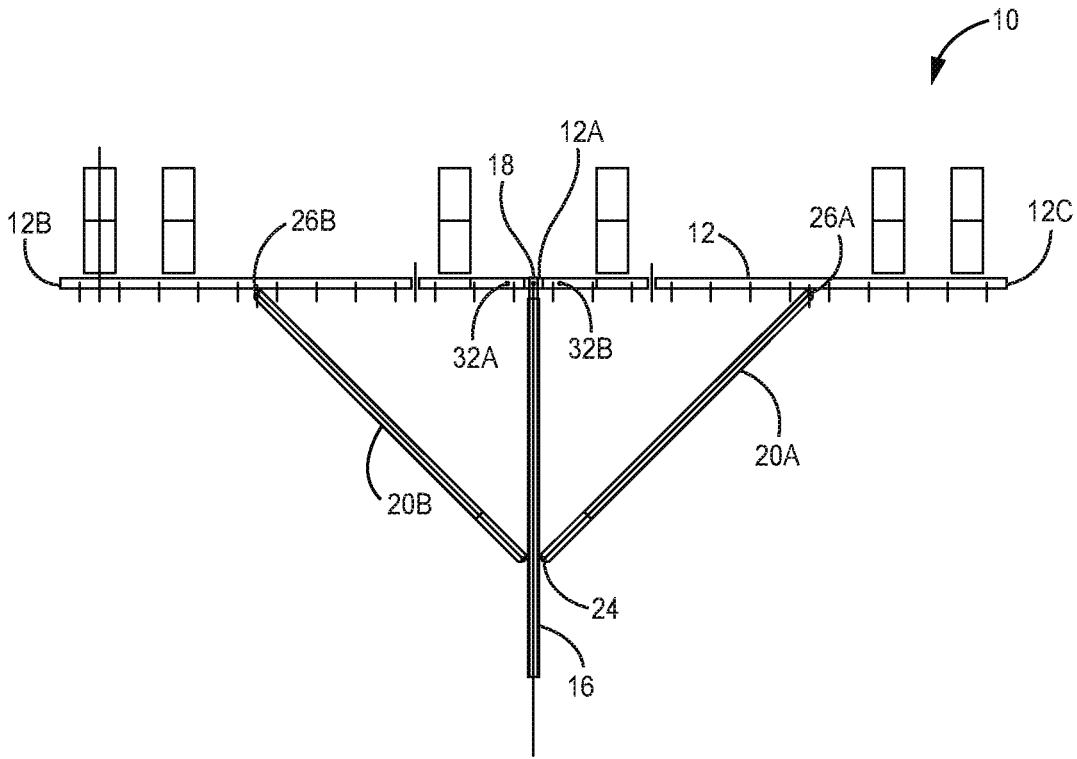
FIG. 3B is a top view of a steerable toolbar system, according to one implementation.

Turning to the drawings in greater detail, as is shown in FIG. 1, large toolbar-type implements 2, particularly with relatively long trailing distances behind tractors 4, may follow a different path (shown generally at 5) around corners and when operated on side hills or other environments. That is, both the heading and/or centerline of toolbar-type implements 2 are not necessarily aligned with those of the tractor 4 or other implement pulling them, as is readily understood. Accordingly, there can be discrepancies between the path traversed by the tractor 4 and toolbar 2.

Further, when the side draft from ground engaging tools mounted to the toolbar 2 is unbalanced between the sides, the toolbar 2 can draft off the path 8 of the pulling tractor 4. Even when optional tractor 4 steering guidance is used, this drafting can have a detrimental effect on the accuracy of the tractor's guidance system for toolbar 2 placement, as is also understood from the references incorporated herein.

As such, the various implementations of the steerable toolbar system 10 disclosed herein and shown in FIGS. 2-11B relate to a practical steering control solution for use in conjunction with fertilizer applicators, planters, cultivators and the like so as to maintain a consistent path 6 for the toolbar 12 that aligns with the path 8 of the tractor 4. Further implementations will be apparent to those of skill in the art.

As shown in FIGS. 3A-4B, in exemplary implementations the steerable toolbar system 10 has a toolbar 12 capable of being disposed on a hitch 16 that is connected to a tractor drawbar with a vertical pin (not shown) so as to allow movement of the hitch 16. At the distal or rear end of the hitch 16, a steerable attachment point 18 connects the hitch 16 to the toolbar 12. In these implementations, the attachment point 18 is a vertical pivot, but in alternate implementations, other types of steerable attachments could be conceived to create the same controlled steering effect such as a side shifting mechanism. Further, in certain implementations, the hitch 16 is optionally an elongate, telescoping hitch 16.

In the implementations of FIGS. 3A-4B, telescoping, elongate draft links 20A, 20B project diagonally rearward from an approximate midpoint 24 on the hitch 16 to an anchoring point 26A, 26B on the toolbar 12, that in certain implementations are generally equally spaced between the center 12A and the ends 12B, 12C of the toolbar 12. However, it is understood that exact equal spacing of the anchoring points 26A, 26B on the draft links 20A, 20B is not critical to the design and should not be considered a requirement. It is further understood that the draft links 20A, 20B are constructed to telescope and retract from a nominal length position.

In various implementations, a position sensor 28, or various position sensors 28A, 28B, 28C, collects data about the positioning or path of the toolbar 12. The control system 34 or steering computer 34 uses the data of the position of the toolbar 12 relative to the path 8 of the tractor 4 to adjust the angle of the toolbar 12 relative to the hitch 16 to maintain alignment. Therefore, the control system 34 uses data from the position sensor 28 to engage linear actuators 22 to telescope and retract the draft links 20A, 20B as needed to modify the path of the toolbar 12.

As shown in FIG. 4A-4D, control of the telescoping and retracting function can be effectuated via a linear actuator 22 or other similar mechanism in operational communication with an optional position sensor 28 and a control system 34 or steering computer 34. In alternate implementations, and as shown in FIGS. 4E-4F, an optional GPS receiver 25, or GPS receivers 25A, 25B, are located on the tractor 4 and/or toolbar 12 to convey position information to the control system 34 or steering computer 34. Further configurations are of course possible, and as described below, in certain implementations, a single position sensor 28 and/or linear actuator 22 can be utilized for the entire toolbar 12.

In various implementations the linear actuator 22 can be, for example, a hydraulic, pneumatic or electric actuator in operational communication with the control system 34, as would be readily appreciated. In various implementations, the position sensor 28 is a rotational position sensor 28 or other similar sensor 28. One such sensor 28A can be in operational communication with the linear actuator(s) 22 to detect the rotational position of the toolbar 12. According to certain implementations, the sensor 28B is mounted at the trailer hitch pin, or other connection point between the hitch 16 and tractor 4, to measure the angle of the tractor 4 to the implement hitch 16. In further implementations, a sensor 28C is mounted at the a steerable attachment point 18 connecting the hitch 16 to the toolbar 12.

The detected rotational position is thereby communicated to the control system 34. According to these implementations, the control system 34 in turn causes the linear actuator (s) 22 and therefore the draft links 20A, 20B to extend and/or retract based on the current position of the toolbar 12 as sensed by the sensor(s) 28, as would be appreciated.

Figure 4A:
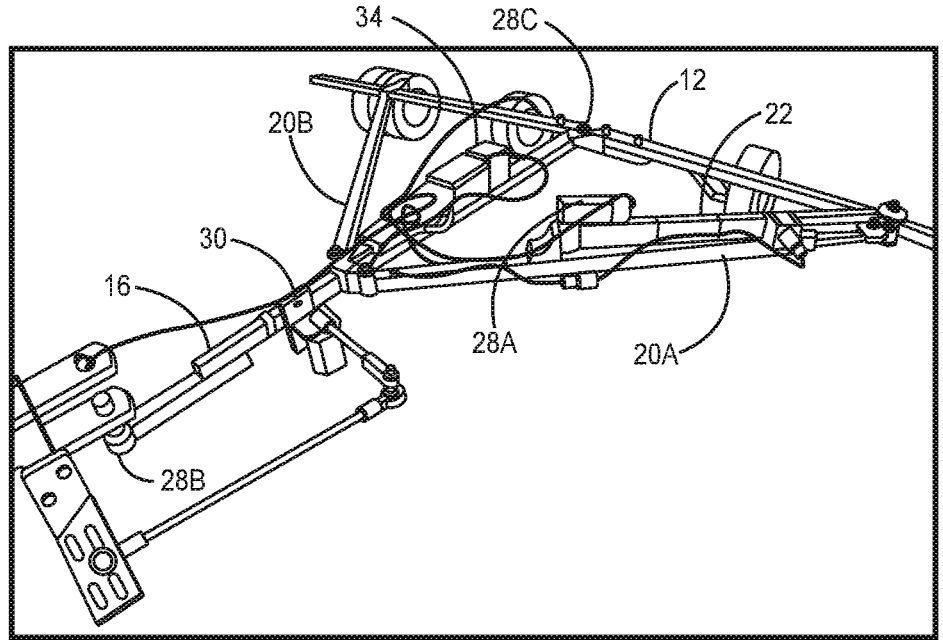
FIG. 4A is a side perspective view of a steerable toolbar system, according to one implementation.
Figure 4B:
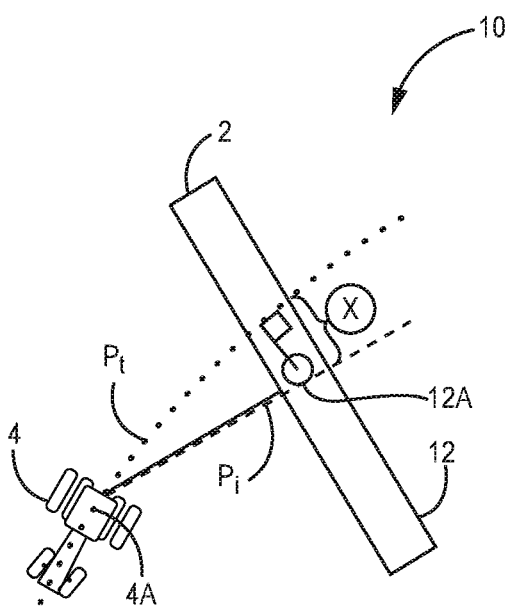
FIG. 4B is a top view of a steerable toolbar system, according to one implementation.

For example, and as shown in FIG. 4B, in certain implementations the tractor path Pt and implement path P_i are not aligned, and therefore have cross-track error (XTE), shown at reference bracket X that is represented by the differences between the tractor path center 4A and toolbar path center 55 12A.

To address the XTE, according to certain implementations, when the sensors 28B, 28C detect such XTE, the control system 34 causes the extension and/or retraction of the linear actuator 22 to specified dimensions or positions, 60 which in turn causes the toolbar 12 to rotate about the rearward vertical pivot 18 relative to the hitch 16.

Figure 4C:
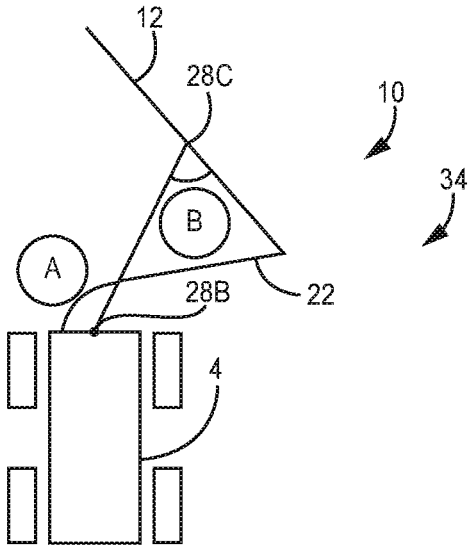
FIG. 4C is a top view of a steerable toolbar system, according to one implementation.
Figure 4D:
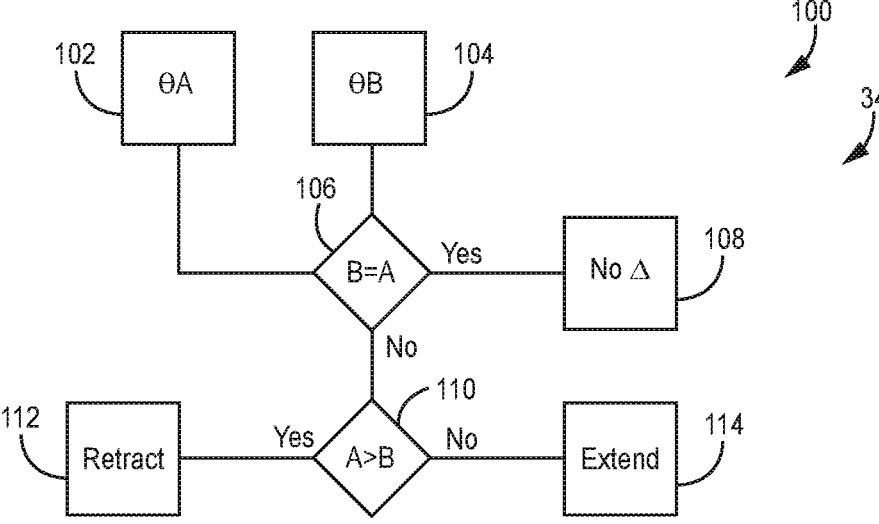
FIG. 4D is a process diagram for a steerable toolbar system, according to one implementation.
Figure 4E:
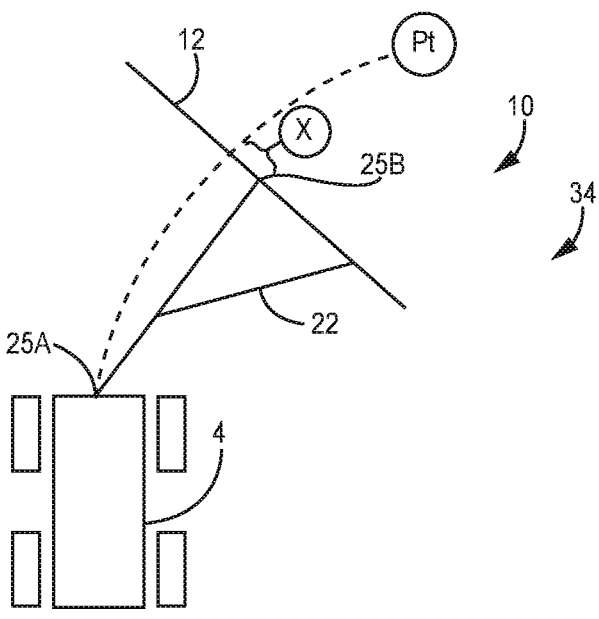
FIG. 4E is a top view of a steerable toolbar system, according to one implementation.
Figure 4F:
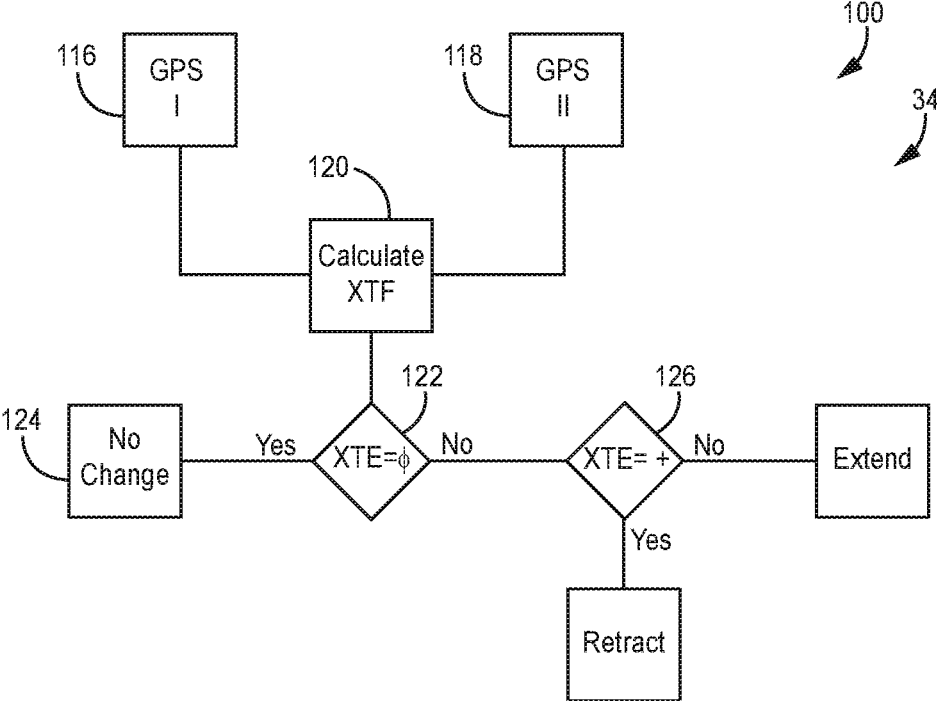
FIG. 4F is a process diagram for a steerable toolbar system, according to one implementation.

As shown in the example of FIGS. 4C-4D, the control system 34 according to these implementations is constructed and arranged to retract or extend the respective draft links 65 20A, 20B via one or more actuators 22 according to cross-track error logic 100 based on sensor 28B, 28C input showing XTE. In the implementation of FIGS. 4C and 4D, the control system 34 compares angles A and B (boxes 102 and 104) to assess whether or not they are equal (box 106). If the angles are equal, no change is made (box 108), but if they are not equal, the logic 100 then asks if A is greater than B (box 110). If A is greater than B, the control system 34 signals the toolbar system 10 to actuate the actuator 22 to actuate the relevant draft links 20A, 20B (box 112). If A is not greater than B, the control system 34 signals the toolbar system 10 to actuate the actuator 22 to actuate the relevant draft links 20A, 20B (box 114). In implementations where more than one actuator is utilized, the individual actuators extend and retract correspondingly, as would be readily appreciated.

In further implementations of the system, and as shown in FIG. 4E-4F, the system 10 comprises a plurality of GPS receivers 25A, 25B configured to detect XTE via GPS signal differentiation between the receivers 25A, 25B. That is, the control system 34 logic 100 inputs the first (box 116) and second (box 118) GPS signals (25A and 25B, respectively) and calculates the XTE (box 120). In these implementations, if the XTE is equal to zero (box 122), the control system 34 stops and makes no changes (box 124).

However, if the XTE does not equal zero, the process continues and assesses whether the XTE is positive (box 126). If the XTE is positive, the actuator 22 is commanded to retract (box 128). If the XTE is negative, the actuator 22 is commanded to extend (box 130). One of skill in the art would appreciate that many such logic configurations and algorithms are of course possible.

Figure 5:
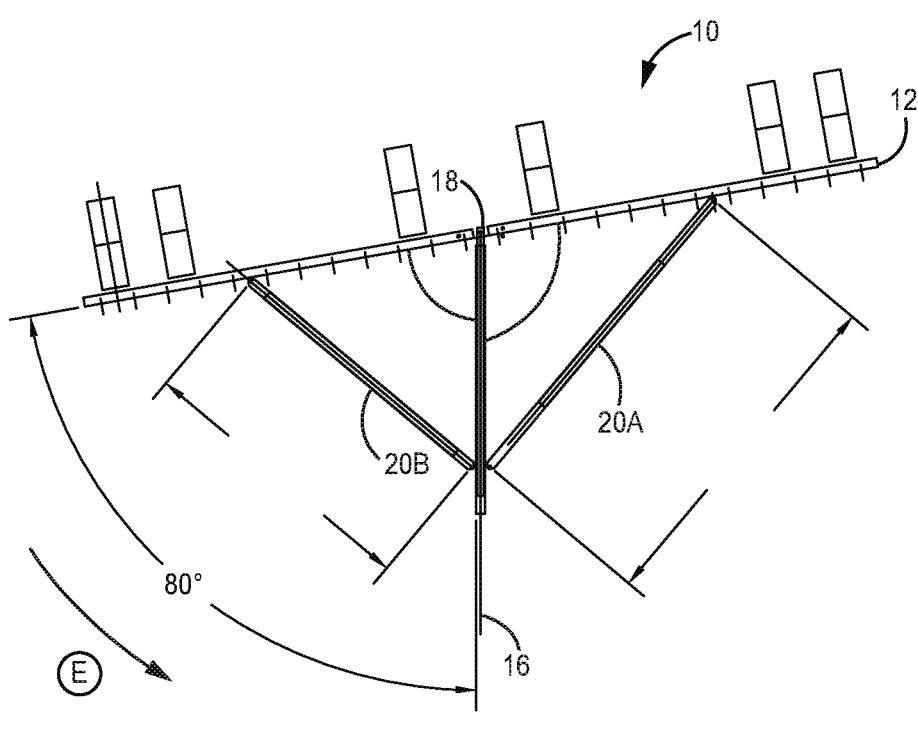
FIG. 5 is a top view of a steerable tool bar, according to one implementation.
Figure 6:
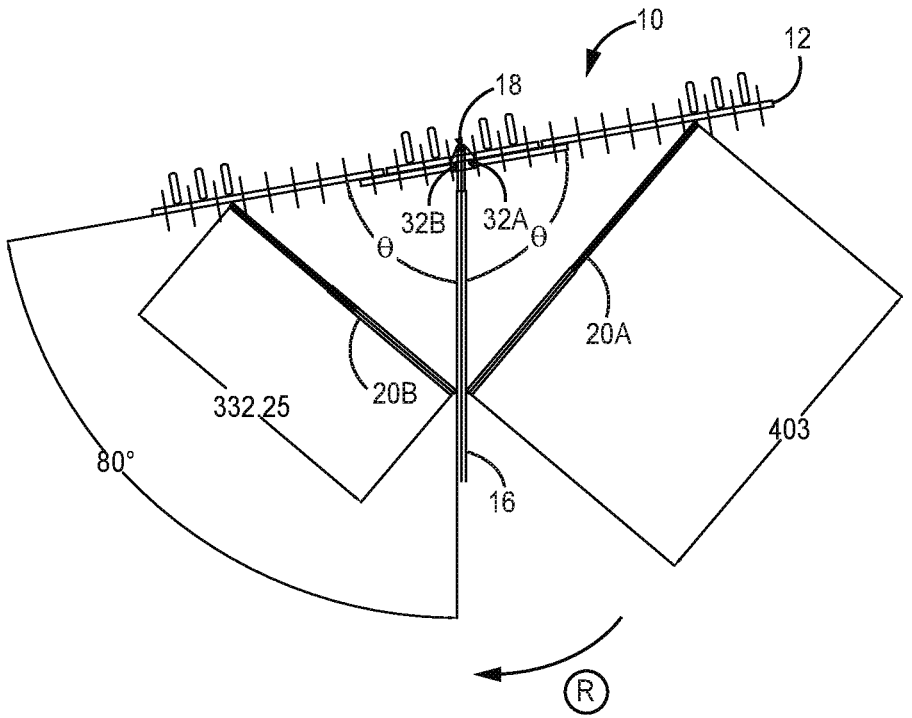
FIG. 6 is a top view of a steerable toolbar, according to one implementation.

Exemplary implementations of the mechanical components of the system 10 are shown, for example, in FIGS. 5-6. It is understood that only one or a plurality of linear actuators 22 can be used to cause the telescoping extension (reference arrow E) or retraction (reference arrow R) of the draft links 20A, 20B to result in the pivoting of the toolbar 12. That is, in one implementation, a single actuator 22 can be responsible for both extension and retraction of just one of the links 20A or 20B, with the opposite draft link 20B or 20A extending or retracting in response, as would be appreciated. In alternate implementations, a pair of actuators (not shown) can be used in a counteracting extension and retraction arrangement, as would also be appreciated. Further implementations are of course be appreciated.

Therefore, in certain of these implementations, the actuator 22/toolbar 12 pitches the soil engaging tools mounted to the toolbar 12 to the right or left, which therefore react against the soil, steering the system 10 to a desired position. It will be appreciated that this same action will cause the implement to stay in a desired position relative to the tractor 4 as the toolbar is drawn forward along the desired path. Further, in certain implementations and as shown in FIGS. 4A-F, one or more position sensors 28 are disposed on various components of the system 10 to relay information about the position of the hitch 16 to the steering computer 34.

In various implementations, the system 10 is operationally integrated with a PWM valve that is controlled by the tractor 4 which can implement a guidance system operating hydraulic actuators, as would be appreciated. In various implementations, feedback from the system 10 can be routed back to the tractor 4 through the various position sensors 28 or GPS receivers 25 discussed herein. Various implementations are also operationally integrated with a mapping system, such as an InCommand® display, as would be appreciated by those of skill in the art.

Figure 7:
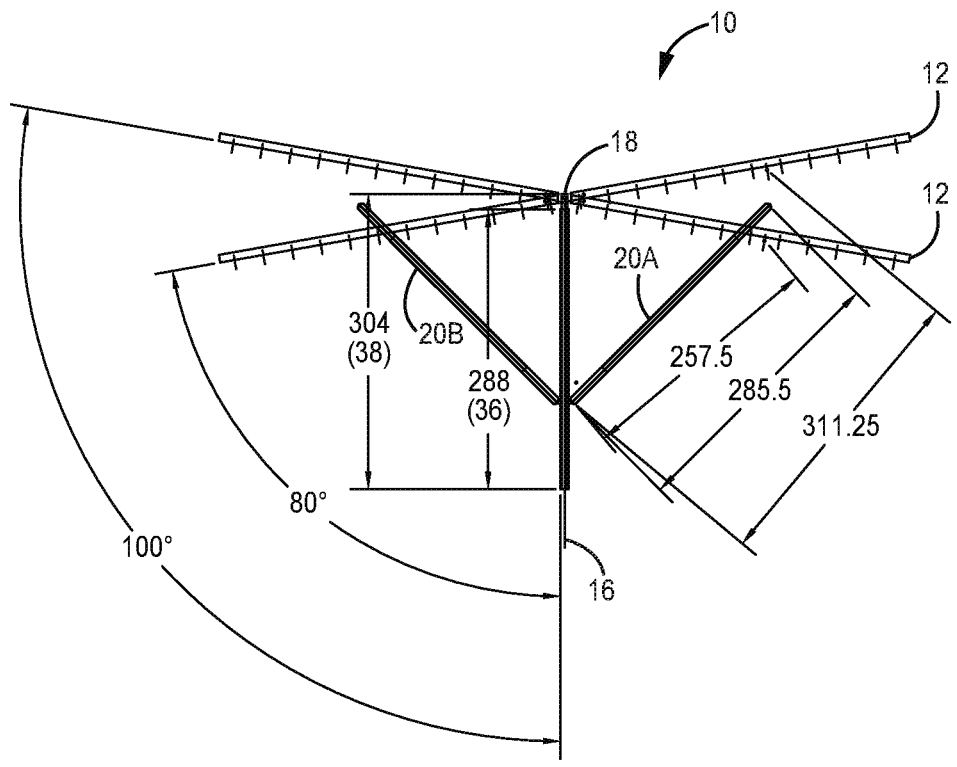
FIG. 7 top view of a steerable toolbar, according to one implementation.

FIGS. 5-7 further exemplify the pivot of the toolbar 12 relative to the hitch 16. FIGS. 5 and 6 exemplify alternate configurations of the steerable toolbar system 10, wherein the system 10 has been constructed with different sets of dimensions. It would be apparent to one skilled in the art that the steerable toolbar system 10 could be constructed with many varying sets of dimensions to accommodate the different implements 2 the system can be used with.

Figure 8:
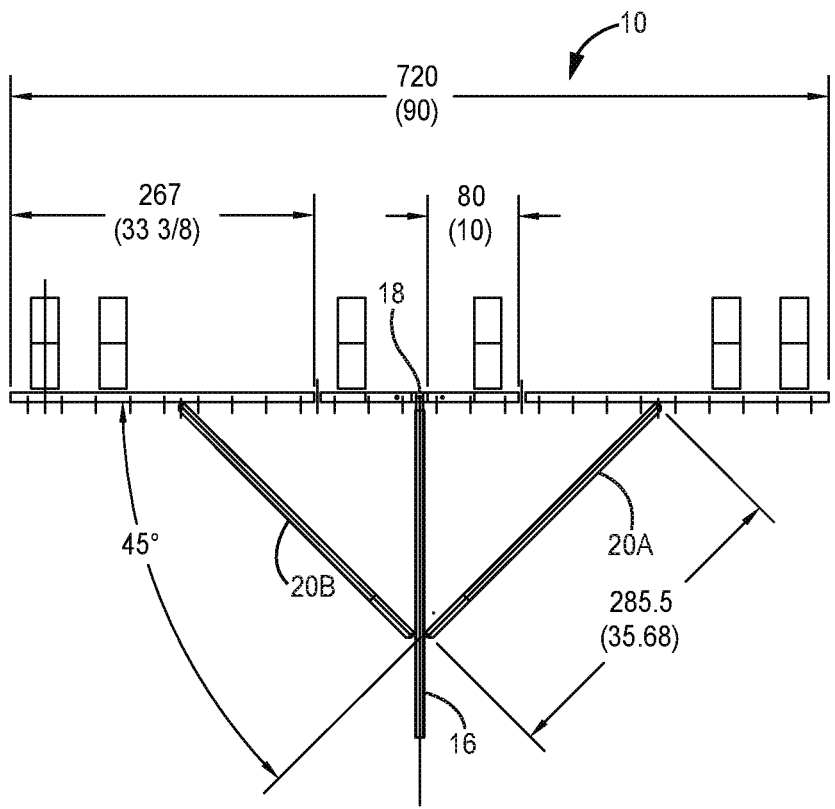
FIG. 8 top view of a steerable toolbar, according to one implementation.

FIG. 7 further depicts various pivot angles of the toolbar 12 with respect to the hitch 16 and the respective exemplary dimensions associated with the different pivot angles. Further, FIG. 8 shows exemplary dimensions of the steerable toolbar system 10 in the nominal configuration, in other words, when the hitch 16 and toolbar 12 are perpendicular.

Figure 9:
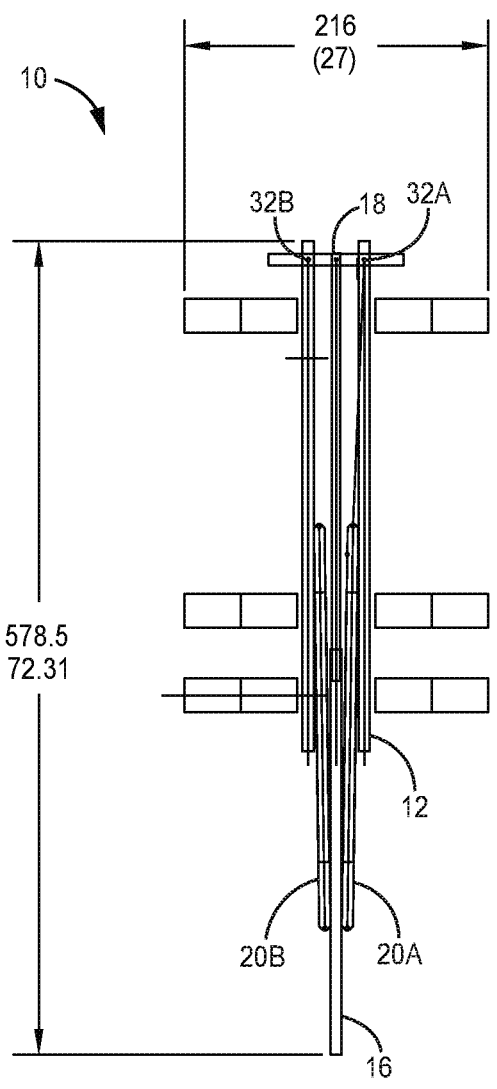
FIG. 9 is a top view of a steerable toolbar system in a compact configuration, according to one implementation.
Figure 10:
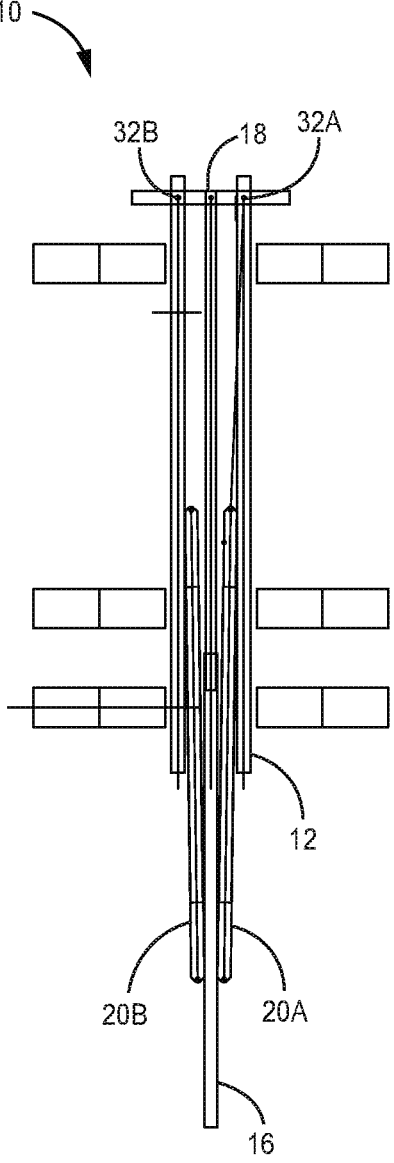
FIG. 10 is a top view of a steerable toolbar system in a compact configuration, according to one implementation.

In further exemplary implementations, as shown in FIGS. 9 and 10, the steerable toolbar system 10 can be folded into a compact configuration. According to this exemplary implementation, the toolbar 12 comprises two fold hinges 32A, 32B (also shown for example in FIGS. 3B and 6) positioned on either side of the steerable attachment point 18. The sides of the toolbar 12 can be folded inward at the fold hinges 32A, 32B such that when folded, the sides of the toolbar 12 are aligned with the hitch, with the tires outward facing.

Prior to folding the toolbar 12, according to various implementations, draft links 20A, 20B must be retracted to the shortest length and disconnected from the attachment point on the hitch 16. As the toolbar 12 is folded inward, the draft links 20A, 20B will slide proximally in the same direction of the fold, such that when the steerable toolbar system 10 is completely folded all of the components are in alignment.

It is understood that in certain implementations, the toolbar 12 will fold without the need to disconnect the forward attachment point of the draft links 20A, 20B from the center hitch structure.

The steerable toolbar system 10 is advantageous because it enables the implement 2 to travel along the same path 8 of the tractor 4 via the continuous adjustments to the pivot or angle of the toolbar 12 with respect to the hitch 16. The continuous feedback and adjustments to the toolbar path eliminates the unfavorable outcomes that result from the implement traveling along a different path 8 than the tractor 4. Using this steerable toolbar 10 and control method, the toolbar path can be controlled to exactly match the tractor path 8. Multiple toolbars 12 with different ground engaging devices and of different widths and hitch lengths can be controlled to exactly or substantially follow the tractor path 8.

It is understood that when a standard toolbar 2 traverses a path 8 with a curvature to the left of a straight-line path, and the tractor guidance is constructed and arranged to steer the tractor 4 along a line that curves to the left, the implement 2 will tend to follow a second path that is somewhat different and of a smaller radius than the path the tractor 4 will take. This divergent path results in an undesirable gap between adjacent passes. Farming operations that use sequential operations with different toolbars 12 such as fertilizer application followed by planting find that it can become difficult to accurately predict where the fertilizer and seed will be placed, resulting in potential lost yield due to misalignment. The steerable toolbar system 10, discussed above, eliminates or greatly reduces these misalignments by maintaining a path fidelity.

It is further understood that when drawing a toolbar 12 along the side of a hill in a straight or curved path 8 gravity will cause the implement 2 to drift downward as it is drawn forward once again resulting in an inexact path-to-path gap or tractor 4 to implement 2 inaccuracy. This could be either wider than desired or narrower than desired depending on the direction on travel and the slope direction of the hill. By sensing the relative position of the toolbar 12 and steering it to follow the path 8 taken by the tractor 4, draft errors caused by sloping terrain will be eliminated or reduced via the system 10.

A further advantage of the system 10 is that wear on soil engaging tools attached to the toolbar 12 is reduced because the tools will be drawn in a straight line direction at all times and will not be subjected to unbalanced side forces as the implement 2 is drawn forward. The corrective steering uses the ground engaging tools to follow the tractor 4. They are not forced to a corrected position by any outside means or pulled at an angle to the direction of travel.

A further advantage is improved accuracy of as-applied field mapping, as can be combined with the teachings of co-pending U.S. application Ser. No. 16/939,785, which is incorporated by reference. Briefly, by recording and accurately mapping the exact locations of the tractor 4 and implement 2, successive passes in the growing process can be more precise. Seed can be placed in the exact position to take the maximum advantage of, for example, fertilizer placement. Further, post emergence applied herbicide and fertilizer applications can be done with accuracy and without crop damage.

In one exemplary implementation, a pre-planting fertilizer application generates an accurate path map for storage, as has been previously described. In turn, planting is done using the pre-planting map to accurately place seed alongside the fertilizer placement so as to prevent damage to the seed, such as by having close contact at germination, or loss of use of the fertilizer by placing the seed too far away from the fertilizer application zone. In these operations, following the planter path with subsequent operations like post emergance fertilizer application and spraying.

In a further exemplary implementations, the system 10 may be used along with a mapping system to allow for following the planter path with the combine and using the guidance to guide the catch cart parallel to the combine path. By having more precise control of the toolbar 12 and mapping operations, as described above, the combine may be able to more accurately follow crop rows during harvest, such that yield loss due to harvesting errors can be minimized.

Although the disclosure has been described with reference to preferred embodiments, persons skilled in the art will recognize that changes may be made in form and detail without departing from the spirit and scope of the disclosed apparatus, systems and methods.

What is claimed is:

1. An agricultural implement comprising:
   (a) a toolbar comprising:
      (i) a pin and
      (ii) at least one ground engaging tool;
   (b) an elongate attachment, a first end of the elongate attachment attached to the toolbar via the pin;
   (c) a first draft link extending between a second end of the elongate attachment and the toolbar;
   (d) a first actuator in operable communication with the first draft link, wherein actuation of the first draft link via the first actuator adjusts the angle of the toolbar relative to the elongate attachment; and
   (e) a controller in electronic communication with the first actuator, wherein the controller is configured to actuate the first draft link to adjust the angle of the toolbar relative to the elongate attachment to maintain alignment of the agricultural implement with a towing vehicle, the towing vehicle connected to the elongate attachment by a hitch.

2. The agricultural implement of claim 1, further comprising a position receiver disposed on the implement.

3. The agricultural implement of claim 1, further comprising a hitch position sensor disposed on the hitch.

4. The agricultural implement of claim 1, wherein the controller is in further communication with a guidance system.

5. The agricultural implement of claim 1, further comprising:

(a) a second draft link extending between the second end of the elongate attachment and the toolbar and (b) a second actuator in operable communication with the second draft link, wherein actuation of the second draft link via the second actuator adjusts the angle of the toolbar relative to the elongate attachment.

6. The agricultural implement of claim 1, further comprising a first hinge positioned on the toolbar on a first side of the pin and a second hinge positioned on the toolbar on a second side of the pin.

7. The agricultural implement of claim 6, wherein the toolbar is configured to fold inward at the first and second hinges into a compact configuration.

8. A method for steering an agricultural implement comprising:

determining a vehicle guidance path on a controller;

traversing the vehicle guidance path with a vehicle, the vehicle attached to the agricultural implement, the agricultural implement comprising an elongate bar and a hitch, wherein the elongate bar is rotatably engaged with a first end of the hitch; and adjusting the angle of the elongate bar relative to the hitch via actuation of an actuator in communication with at least one draft link, wherein the at least one draft link extends between a second end of the hitch and the elongate bar such that the agricultural implement traverses the vehicle guidance path with path fidelity.

9. The method of claim 8, further comprising storing the vehicle guidance path traveled for use in subsequent operations.

10. The method of claim 8, wherein the angle of the elongate bar is adjusted on-the-go.

11. The method of claim 8, further comprising sensing the position of the agricultural implement via at least one position sensor.

12. The method of claim 8, further comprising mapping exact locations of the vehicle and the agricultural implement during operation.

13. The method of claim 8, wherein the vehicle is a tractor and the implement is a planter.

* * * * *